(12) United States Patent
Somji

(10) Patent No.: US 7,546,996 B2
(45) Date of Patent: Jun. 16, 2009

(54) WRITING TABLET MOUNTING DEVICE

(76) Inventor: Mohamed Iqbal Somji, 532 Coyote Canyon Way, Brea, CA (US) 92821

(*) Notice: Subject to any disclaimer, the term of this patent is extended or adjusted under 35 U.S.C. 154(b) by 290 days.

(21) Appl. No.: 11/215,232

(22) Filed: Aug. 30, 2005

(65) Prior Publication Data

US 2007/0045493 A1 Mar. 1, 2007

(51) Int. Cl.
*A47B 97/04* (2006.01)
(52) U.S. Cl. ............... 248/451; 248/229.14; 248/447.2; 248/231.61; 269/6
(58) Field of Classification Search ............ 248/229.14, 248/442.2, 443, 444, 448, 451, 229.1, 229.12, 248/229.15, 447.2, 918, 229.24, 228.5, 230.5, 248/231.61, 316.1, 316.6, 316.4, 316.8; 269/3, 269/6, 249
See application file for complete search history.

(56) References Cited

U.S. PATENT DOCUMENTS

| | | | | |
|---|---|---|---|---|
| 307,439 | A * | 11/1884 | Corbett | 269/146 |
| 1,198,186 | A | 9/1916 | Brown | |
| 1,282,489 | A | 10/1918 | Strodel | |
| 1,376,272 | A * | 4/1921 | Handley | 248/451 |
| 1,654,027 | A * | 12/1927 | Westerfors | 248/445 |
| 1,818,501 | A * | 8/1931 | Odin | 269/169 |
| 1,821,060 | A | 9/1931 | Isaacson | |
| 2,862,328 | A | 12/1958 | Wadsworth | |
| 3,106,376 | A | 10/1963 | Scott | |
| 3,350,150 | A | 10/1967 | Schwarm | |
| 3,476,341 | A | 11/1969 | Patterson | |
| 3,514,066 | A * | 5/1970 | Henley et al. | 248/445 |
| 4,467,991 | A | 8/1984 | Bailes | |
| 4,548,391 | A | 10/1985 | Loban | |
| 5,222,690 | A | 6/1993 | Jeffords | |
| 5,292,099 | A * | 3/1994 | Isham et al. | 248/442.2 |
| 5,584,457 | A | 12/1996 | Fawcett | |
| 5,584,458 | A | 12/1996 | Rando | |
| 5,615,856 | A * | 4/1997 | Simington | 248/452 |
| 5,658,014 | A | 8/1997 | Barker et al. | |
| 5,979,940 | A * | 11/1999 | Araghi | 281/45 |
| 6,029,964 | A * | 2/2000 | Bohl | 269/6 |
| 6,244,759 | B1 * | 6/2001 | Russo | 396/428 |
| 6,293,058 | B1 | 9/2001 | Sink | |
| 6,438,854 | B1 | 8/2002 | Kott, Jr. | |
| 7,066,457 | B2 * | 6/2006 | Gerritsen et al. | 269/6 |
| 7,140,582 | B1 * | 11/2006 | Miller et al. | 248/231.41 |

* cited by examiner

*Primary Examiner*—Anita M King
(74) *Attorney, Agent, or Firm*—Stetina Brunda Garred & Brucker

(57) ABSTRACT

A device is provided for securing a writing tablet to a frame member. The tablet defines first and second opposing lateral edges. The device comprises an elongate bar, a clamp member, and first and second support elements. The elongate bar defines a distal end. The clamp member is attached to the distal end of the bar and is fastenable to the frame member. The first and second support elements are attached to the bar and are positionable along a length of the bar. The support elements each include an engagement surface configured to engage the first and second lateral edges of the tablet.

5 Claims, 3 Drawing Sheets

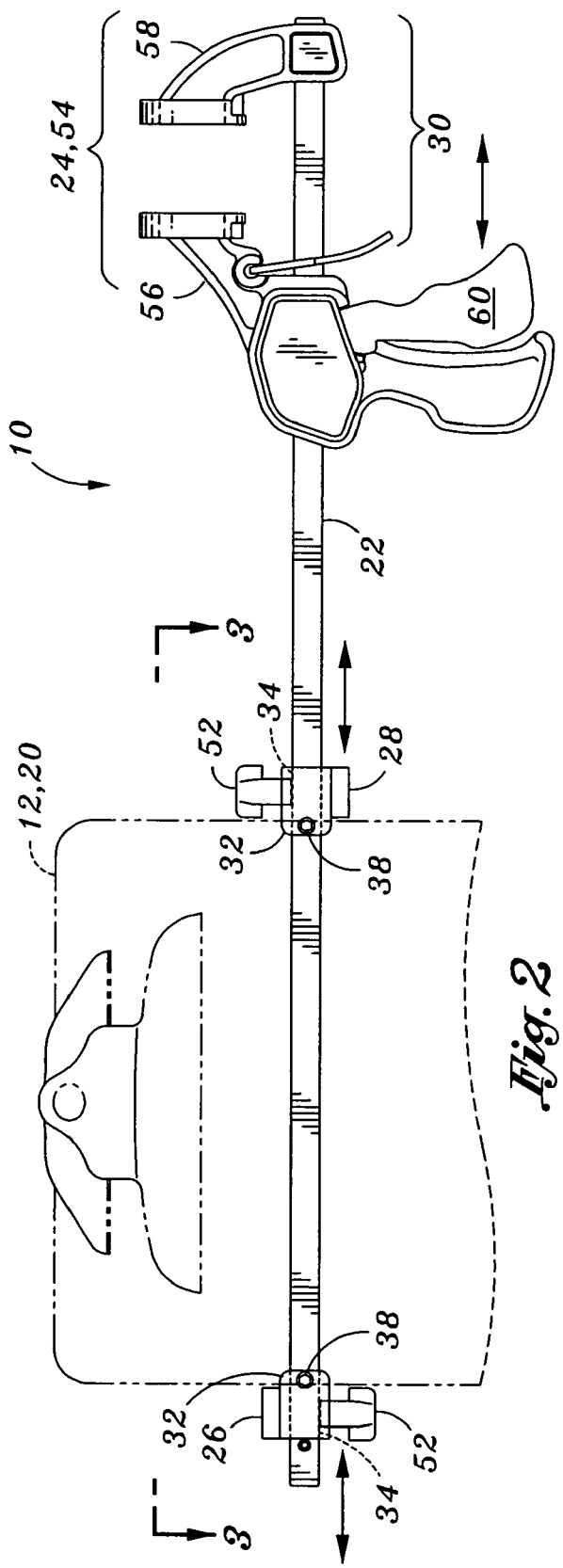
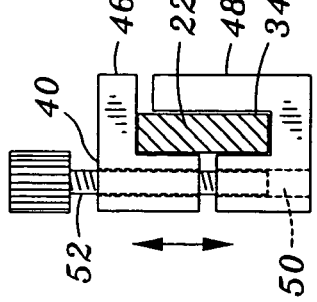
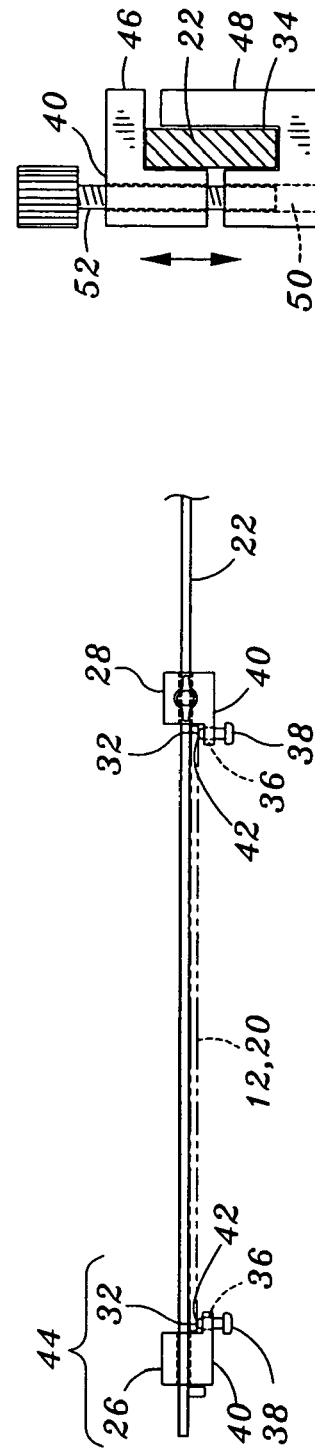

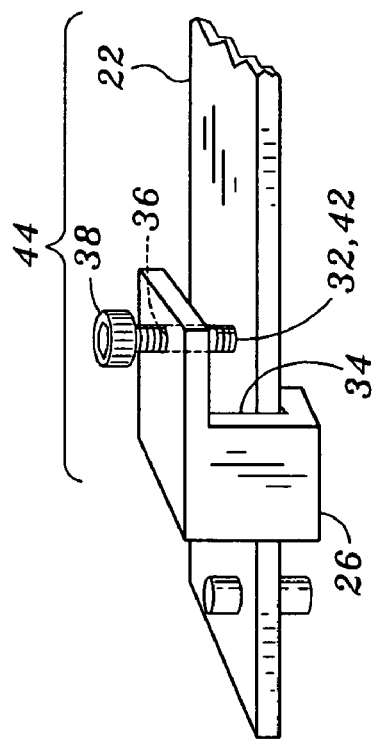
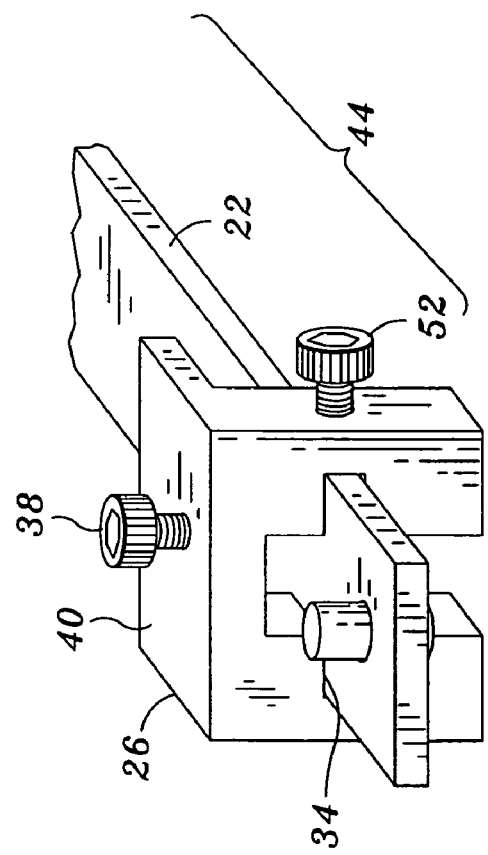
Fig. 5
Fig. 6

WRITING TABLET MOUNTING DEVICE

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates generally to writing implements and more particularly to a device that may be utilized to mount a writing tablet, such as a clipboard, to a frame member such as an exposed 2×4 or a door to facilitate use of the tablet in places such as residential or commercial construction sites, homes, or office buildings.

The well-known mechanics of writing generally require at least three things: a writing instrument, a hard work surface against which the writing instrument may be pressed, and a medium upon which the writing may be performed, usually by placing the medium intermediate the writing instrument and the work surface. Although the medium may sometimes be sufficiently hard so that the writing instrument may effectively be pressed against it, the medium is more frequently a flimsy paper that cannot support the required pressure. Sometimes, in order to compensate for lack of a hard work surface, an individual may have used the palm of their hand or the hunched back of an accommodating friend. Of course, to the certain delight of such benevolent friends, the clipboard alleviates the challenge of searching for a hard work surface when writing must be done.

Indeed, clipboards have proved to be very useful instruments due to their mobility and ease of use. The traditional clipboard includes a rigid work surface and a spring-actuated clamp attached thereto that accommodates and secures various papers or forms to the rigid work surface to facilitate writing thereon. The clipboard is used in numerous situations and environments where a table or other flat surface is not easily accessible to facilitate writing. In practice, the individual typically holds the clipboard with their "non-writing hand" and writes upon the clipboard with their "writing hand."

Despite the apparent ease of use, utilization of the clipboard definitely requires at least one "non-writing" hand, leg, or other "support" in addition to the "writing hand." Often, when performing tasks, the individual may have one hand occupied, and a clipboard may not be easily held or used. In such cases, the individual may resort to resting the clipboard on their lap, arm, leg, some other structure, or another person while freeing their "writing hand" in order to make the needed notation. In other cases, the individual may have to free both hands to hold the clipboard, which may require that she sets down whatever tool or instrument that she is currently holding. Indeed, although it is a useful tool, the clipboard definitely requires the "support" in addition to the "writing hand."

Some environments often make a clipboard difficult to use because although the "writing hand" may be available, the "support" or "non-writing hand" may not. For example, a worker at a residential or commercial construction site may often be required to take measurements using a tape measure or other device and to record those measurements. In order to do so, the worker likely needs at least three tools: the tape measure, a writing instrument, and at least one sheet of paper. Frequently, the worker may additionally utilize a clipboard because it provides a sturdy and clean work surface in an environment where tables, writing areas, or other supports are typically unavailable or dirty. Even at a home or office building, it is unlikely that furniture or other supports may be conveniently positioned such that the worker can support the paper thereon. As a result, in order to properly support a clipboard at residential or commercial construction sites, homes, or office buildings, a worker may be required to either set down at least one of the tools that he is using or to precariously balance all of the tools and the clipboard in one arm while writing on the clipboard with the "writing hand."

Given these difficulties, there is a need in the art for a mobile work piece that may be utilized by a worker at residential or commercial construction sites, homes, or office buildings that facilitates the use of a clipboard or other writing tablet. In particular, there exists a need in the art for a clipboard mounting device that may be quickly, easily, and reliably positioned by the worker at residential or commercial construction sites, homes, or office buildings. There is a need in the art for a writing tablet mounting device that may be adjusted to receive a clipboard or tablets of other sizes. In addition, there exists a need in the art for a clipboard mounting device that is sized and configured to conserve space and yet provide rigid and durable support for the clipboard or writing tablet.

BRIEF SUMMARY

A device is provided for securing a writing tablet to a frame member. The tablet defines first and second opposing lateral edges. The device comprises an elongate bar, a clamp member, and first and second support elements. The elongate bar defines a distal end. The clamp member is attached to the distal end of the bar and is fastenable to the frame member. The first and second support elements are attached to the bar and are positionable along a length of the bar. The support elements each include an engagement surface configured to engage the first and second lateral edges of the tablet.

In accordance with an embodiment of the present invention, the first and second support elements may be configured to laterally capture the tablet. The first and second support elements may be clamps. The engagement surfaces of each of the first and second support elements may be configured to secure the tablet interposed between the first and second support elements and the bar. The first and second support elements may each include a slot. In this regard, the slot may be sized and configured to receive the bar for attaching the first and second support elements to the bar. The slot may be closed.

At least one of the first and second support elements may be rigidly attached to the bar. Additionally, at least one of the first and second support elements may further include a hole and a bolt. The hole may be a through hole directed from an outer surface of the respective support element inwardly toward the bar. The bolt may define a bolt tip. The bolt may also be selectively advanceable into the hole. The bolt tip may be operative to engage one of the first and second lateral edges of the tablet to secure the tablet. In this regard, the bolt tip may define the engagement surface of the respective support element. Finally, the elongate bar may define a substantially rectangular cross section.

According to another embodiment of the present invention, a clipboard mounting device is provided for securing a clipboard to a frame member. The clipboard may define first and second opposing lateral edges. The device comprises an elongate bar, a clamp member, and first and second support elements. The elongate bar defines distal and proximate ends. The clamp member is attached to the distal end of the bar and is fastenable to the frame member. The first and second support elements are attached to the bar. The first support element is disposed at the proximate end of the bar. The second support element is slidably positionable along a length of the bar. The second support element includes a slot being sized and configured to receive the bar therethrough to facilitate the slidable motion of the second support element on the bar. The support elements each include an engagement surface configured to engage the first and second lateral edges of the tablet to laterally capture the tablet.

In accordance with an implementation of the present invention, the slot of the second support element may be a closed slot. The first support element may be rigidly disposed at the proximate end of the bar. The second support element may include a bar fastener being selectively adjustable to reduce the size of the slot. In this regard, the second support element may rigidly engage the bar in response to the reduced size of the slot.

Additionally, the second support element may include upper and lower clamp portions being connectable to each other and defining the slot therebetween. The upper and lower clamp members may be selectively adjustable relative to each other to adjust the size of the slot.

The second support element may further include an aperture and a bar fastener. The aperture may be at least partially disposed through the upper and lower clamp portions. The bar fastener may be selectively insertable into the aperture to facilitate relative movement between the upper and lower clamp portions. In this regard, the relative movement of the upper and lower clamp members may be operative to reduce the size of the slot for securing the second support element to the bar.

In accordance with yet another embodiment of the present invention, a clipboard mounting device is provided for securing a clipboard to a frame member. The clipboard defines first and second opposing lateral edges. The device comprises an elongate bar, a clamp member, and first and second support elements. The elongate bar defines distal and proximate ends. The clamp member is attached to the distal end of the bar and is fastenable to the frame member. The first and second support elements are attached to the bar. The first and second support elements are slidably positionable along a length of the bar. The first and second support elements each include a slot and a bar fastener. The slot is sized and configured to receive the bar therethrough to facilitate the slidable motion of the respective ones of the first and second support elements on the bar. The bar fastener is selectively adjustable to reduce the size of the slot for securing the respective ones of the first and second support elements to the bar. The first and second support elements each include an engagement surface configured to engage the first and second lateral edges of the tablet to laterally capture the tablet.

The first and second support elements may each include a hole and the bar fastener is a bolt. The hole may be directed from an outer surface of the respective ones of the first and second support elements inwardly until reaching the respective slot. The bolt may be selectively insertable into the hole to engage the bar disposed through the slot. The engagement of the bolt with the bar being operative to impede movement of the respective ones of the first and second securing elements along the bar.

In accordance with another implementation of the present invention, the clamp member may be a C-clamp including a movable jaw and a fixed jaw. The movable jaw may be movable along the bar relative to the fixed jaw for capturing the frame member therebetween. Additionally, the C-clamp may include a trigger handle being operative to selectively move the movable jaw along the bar toward the fixed jaw.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 2 is a front view illustrating the positioning of first and second support elements and a clamp member along an elongate bar of the device;

FIG. 3 is a top view along the elongate bar illustrating the spacing of the first and second support elements in relation to the writing tablet in accordance with an embodiment of the present invention;

FIG. 4 is a side view of a support element in accordance with an aspect of the present invention;

FIG. 5 is a perspective view of the support element illustrating exemplary placement of a bolt for securing the writing tablet in accordance with an aspect of the present invention; and FIG. 6 is a perspective view of the support element including an open slot and illustrating exemplary positioning of a bar fastener in accordance with another aspect of the present invention.

DETAILED DESCRIPTION

Figure 1:
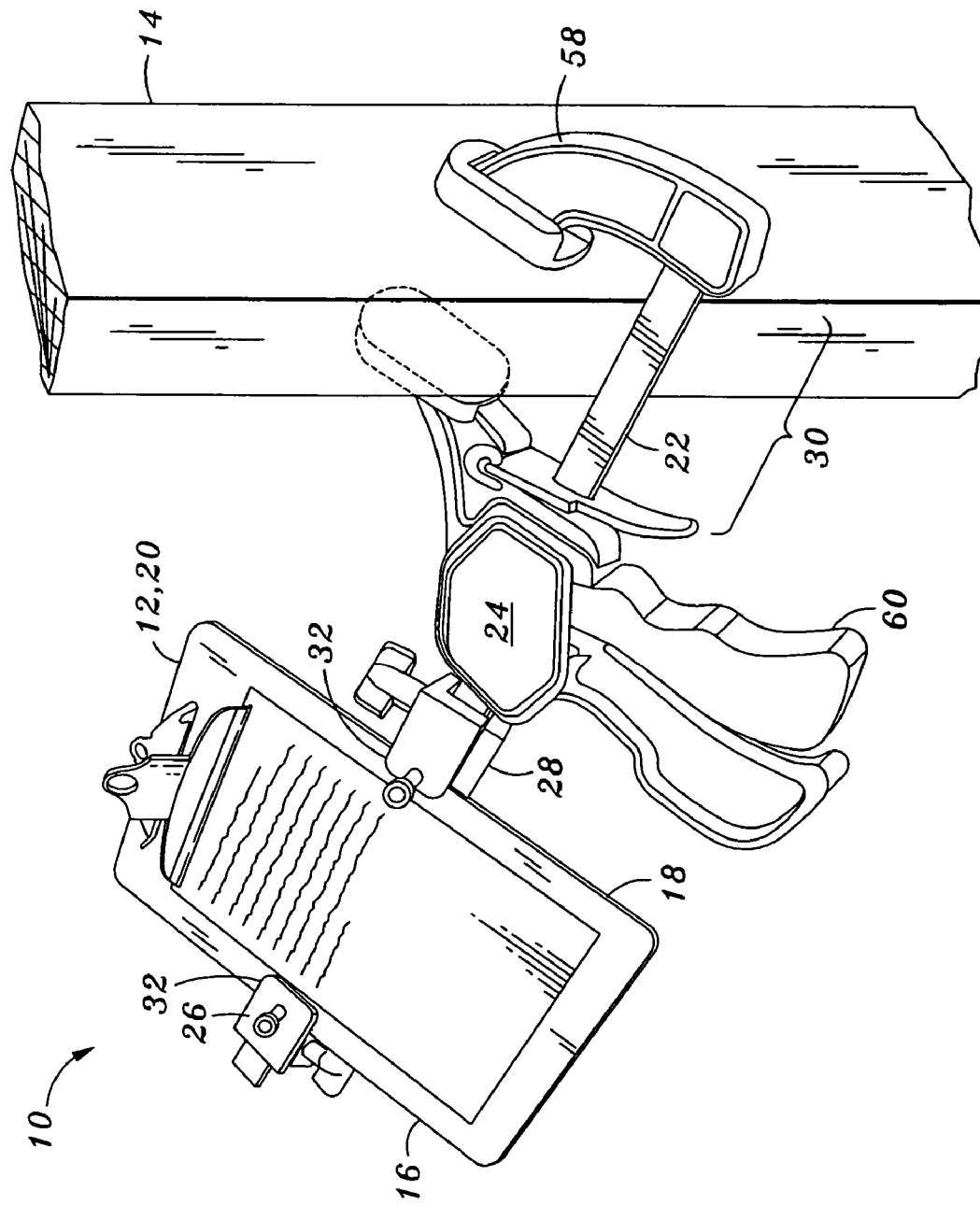
FIG. 1 is a perspective view of a device for securing a writing tablet to a frame member in accordance with an embodiment of the present invention.

Referring now to the drawings wherein the showings are for purposes of illustrating the preferred embodiment of the present invention only and not for purposes of limiting the same, FIG. 1 is a perspective view of a device 10 for securing a writing tablet 12 to a frame member 14 in accordance with an embodiment of the present invention. It is contemplated that implementations of the present device 10 may be utilized at residential or commercial construction sites, homes, office buildings, or other various places and for numerous applications. As will be apparent given the disclosure herein, implementations of the present invention are very versatile and may provide a unique solution for individuals who need a portable, lightweight work surface that may be easily mounted upon available frame members. In this regard, the frame member 14 may be an exposed wood stud, as at residential or commercial construction site, or a door, as at a home or office building. However, the frame member 14 may be any available structure that is suitably strong to support the device 10, preferably a structure that is vertical and narrow. However, with modifications to the device 10, a structure of virtually any configuration may be utilized.

The tablet 12 defines first and second opposing lateral edges 16, 18. The tablet 12 may be of various configurations, and as shown in FIG. 1, the tablet 12 may preferably be a clipboard 20. However, the tablet 12 may also be a notepad, book, folder, or other writing implement. Preferably, the tablet 12 may be stiff, such as the clipboard 20, and thus be able to support the weight of a hand and the pressure which must be applied in order to write upon the tablet 12.

Referring again to FIG. 1, the device 10 comprises an elongate bar 22, a clamp member 24, and first and second support elements 26, 28. As shown in FIG. 1, the elongate bar 22 defines a distal end 30. The clamp member 24 is attached to the distal end 30 of the bar 22 and is fastenable to the frame member 14. Although it is contemplated that the attachment of the clamp member 24 to the frame member 14 may be done through cantilevering, as shown in FIG. 1, the clamp member 24 may be attached in various manners onto different types of frame members. The first and second support elements 26, 28 are attached to the bar 22 and are positionable along a length of the bar 22, as shown in FIG. 2. The support elements each include an engagement surface 32 configured to engage the first and second opposing lateral edges 16, 18 of the tablet 12.

In accordance with an embodiment of the present invention, the first and second support elements 26, 28 may be configured to laterally capture the tablet 12. The lateral capturing of the tablet 12 may be performed in a variety of ways. For example, the lateral capturing may be performed by positioning the first and second support elements 26, 28 at fixed positions along the bar 22. In such an embodiment, the first and second support elements 26, 28 may be clamps. The tablet 12 may be clamped to the bar 22 by the first and second support elements 26, 28, as illustrated in FIG. 3. Thus, the engagement surfaces 32 of each of the first and second support elements 26, 28 may be configured to secure the tablet 12 interposed between the first and second support elements 26, 28 and the bar 22. However, the clamps may also clamp the tablet 12 to the respective ones of the first and second support elements 26, 28 themselves. In another embodiment, the lateral capturing may be performed by laterally compressing the tablet 12 in between the first and second support elements 26, 28. Other methods of laterally capturing the tablet 12, including those whereby the tablet 12 is not interposed between the first and second support elements 26, 28, may be performed by one of skill in the art utilizing the teachings found herein.

The first and second support elements 26, 28 may be variously configured. Illustrations of exemplary configurations are provided in the accompanying drawings. However, it should be noted that the first and second support elements 26, 28 may be configured to be slidable along the bar 22 or to be rigidly attachable to the bar 22. For example, the first and second support elements 26, 28 may be configured to be attachable to the bar 22 as by conventional screws or other methods. Additionally, the bar 22 may be configured to include a longitudinal slit through which a portion of the first and second support elements 26, 28 may be disposed for mounting and positioning upon the bar 22. Thus, the first and second support elements 26, 28 may be configured to at least partially surround the bar 22 or to be at least partially disposed through a longitudinal slit in the bar 22. Indeed, various such combinations and variations may be created within the scope of the present invention. Finally, the first and second support elements 26, 28 may be manufactured of various materials such as plastic, aluminum, or other metals.

As illustrated in FIGS. 2 and 3, according to a preferred embodiment, the first and second support elements 26, 28 may each include a slot 34. In a preferred embodiment, the slot 34 may be sized and configured to receive the bar 22 for attaching the first and second support elements 26, 28 to the bar 22. Thus, the slot 34 may be closed, as shown in FIG. 4. However, it is also contemplated that the slot 34 may be formed to be open, as shown in FIG. 6. The slot 34 may thus be variously formed and positioned with respect to the bar 22 and within the respective one of the first and second support elements 26, 28. Such embodiments may foreseeably facilitate the placement of the first and second support members onto the bar 22 without requiring removal of other elements along the bar 22. For example, the first and second support elements 26, 28, as mentioned above, may be clamps and may clamp to the bar 22 and utilize another clamp section to secure the tablet 12.

At least one of the first and second support elements 26, 28 may be rigidly attached to the bar 22. Thus, at least one of the first and second support elements 26, 28 may be integrally formed with the bar 22. It is contemplated that the first and second support elements 26, 28 may both be integrally formed into the bar 22. For example, the bar 22 may include the first and second support elements 26, 28 and be injection molded as a complete unit. However, various combinations and other configurations may be created utilizing other materials and processes known in the art.

As shown in FIGS. 3 and 5, at least one of the first and second support elements 26, 28 may further include a hole 36 and a bolt 38. The hole 36 may be a through hole 36 directed from an outer surface 40 of the respective support element inwardly toward the bar 22. The hole 36 may include a threaded portion for facilitating the entry and use of the bolt 38. Accordingly, the bolt 38 may be configured to correspond to the threaded portion of the hole. The bolt 38 may also define a bolt tip 42. The bolt 38 may be selectively advanceable into the hole 36 and may be operative to engage one of the first and second opposing lateral edges 16, 18 of the tablet 12 to secure the tablet 12. In this regard, the bolt tip 42 may define the engagement surface 32 of the respective support element.

It is contemplated that the bar 22 may be demarcated according to the various widths of tablets, such as clipboards, books, etc. Such demarcation may facilitate the positioning of the first and second support elements 26, 28. In addition, the first and second support elements 26, 28 may also be configured to attach to the bar 22 at such demarcated locations. In this regard, there may be a certain number of positions that may be occupied by the first and second support elements 26, 28. For example, the bar 22 may include various holes that correspond to such positions, and the first and second support elements 26, 28 may be attachable to the bar 22 utilizing the holes.

The elongate bar 22 may also be variously configured according to various implementations of the present invention. For example, the bar 22 may define a substantially rectangular cross section, as shown in FIG. 1. However, the bar 22 may be configured as an I-beam, a cylindrical or circular cross-section, or otherwise. Indeed, it is contemplated that altering the configuration of the bar 22 may directly affect the stiffness and other strength properties of the overall device 10 upon being mounted on the frame member 14. In addition, the bar 22 may be fabricated from various materials, such as plastics, metals, and composites. Thus, a person of skill in the art may devise various configurations incorporating many such improvements within the scope of the present invention.

In use, the tablet 12 may be positioned adjacent the first and second support elements 26, 28 along the bar 22. At least one of the first and second support elements 26, 28 should be rigidly secured to the bar 22. At this point, the tablet 12 may be secured to the first and second support elements 26, 28 at the respective ones of the first and second opposing lateral edges 16, 18. Finally, the clamp member 24 may be attached to the frame member 14, such as a door, a 2×4, or other structure. The user may then write upon the tablet 12. Such steps may be performed in any order, and may be modified according to the structure of the device 10, the tablet 12, and of the frame member 14.

According to another embodiment of the present invention, a clipboard 20 mounting device 10 is provided for securing a clipboard 20 to a frame member 14. The clipboard 20 may define first and second opposing lateral edges 16, 18. The device 10 comprises an elongate bar 22, a clamp member 24, and first and second support elements 26, 28. The elongate bar 22 defines distal and proximate ends 30, 44. The clamp member 24 is attached to the distal end 30 of the bar 22 and is fastenable to the frame member 14. The first and second support elements 26, 28 are attached to the bar 22. The first support element 26 is disposed at the proximate end 44 of the bar 22. The second support element 28 is slidably positionable along a length of the bar 22. The second support element 28 includes a slot 34 being sized and configured to receive the bar 22 therethrough to facilitate the slidable motion of the second support element 28 on the bar 22. The support elements each include an engagement surface 32 configured to engage the first and second opposing lateral edges 16, 18 of the tablet 12 to laterally capture the tablet 12.

In accordance with a preferred embodiment of the present invention, as shown in FIG. 4, the slot 34 of the second support element 28 may be a closed slot 34, although as mentioned above, the slot 34 may also be open, as shown in FIG. 6. The first support element 26 may be rigidly disposed at the proximate end 44 of the bar 22. As mentioned above, the first support element 26 may be integrally formed with the bar 22 or may simply be bonded, welded, or otherwise adhered thereto. The second support element 28 may include a bar fastener 52 which is selectively adjustable to reduce the size of the slot 34. In this regard, the second support element 28 may rigidly engage the bar 22 in response to the reduced size of the slot 34. To that end, as shown in FIG. 4, the second support element 28 may include upper and lower clamp portions 46, 48 being connectable to each other and defining the slot 34 therebetween. Thus, the upper and lower clamp portions 46, 48 may be selectively adjustable relative to each other to adjust the size of the slot 34.

In addition, the second support element 28 may further include an aperture 50 and a bar fastener 52, as shown in FIG. 4. The aperture 50 may be at least partially disposed through the upper and lower clamp portions 46, 48. The bar fastener 52 may be selectively insertable into the aperture 50 to facilitate relative movement between the upper and lower clamp portions 46, 48. Thus, the aperture 50 may be a hole, such as a threaded hole, and the bar fastener 52 may be a screw that is inserted within the aperture 50. In this regard, the relative movement of the upper and lower clamp member 24s may be operative to reduce the size of the slot 34 for securing the second support element 28 to the bar 22, as may be envisioned from FIG. 4.

In accordance with yet another embodiment of the present invention, a clipboard 20 mounting device 10 is provided for securing a clipboard 20 to a frame member 14. The clipboard 20 defines first and second opposing lateral edges 16, 18. The device 10 comprises an elongate bar 22, a clamp member 24, and first and second support elements 26, 28. The elongate bar 22 defines distal and proximate ends 30, 44. The clamp member 24 is attached to the distal end 30 of the bar 22 and is fastenable to the frame member 14. The first and second support elements 26, 28 are attached to the bar 22. The first and second support elements 26, 28 are slidably positionable along a length of the bar 22. The first and second support elements 26, 28 each include a slot 34 and a bar fastener 52. The slot 34 is sized and configured to receive the bar 22 therethrough to facilitate the slidable motion of the respective ones of the first and second support elements 26, 28 on the bar 22. The bar fastener 52 is selectively adjustable to reduce the size of the slot 34 for securing the respective ones of the first and second support elements 26, 28 to the bar 22. The first and second support elements 26, 28 each include an engagement surface 32 configured to engage the first and second opposing lateral edges 16, 18 of the tablet 12 to laterally capture the tablet 12.

The first and second support elements 26, 28 may each include a hole 36 and the bar fastener 52 is a bolt 38, as illustrated in FIGS. 5 and 6. The hole 36 may be directed from an outer surface 40 of the respective ones of the first and second support elements 26, 28 inwardly until reaching the respective slot 34. The bolt 38 may be selectively insertable into the hole 36 to engage the bar 22 disposed through the slot 34. The engagement of the bolt 38 with the bar 22 being operative to impede movement of the respective ones of the first and second support elements 26, 28 along the bar 22. Other modifications may include holes along the bar 22 wherein the bar fastener 52 may be engaged. The bar fastener 52 may also include spring-loaded pins and the like.

In accordance with another implementation of the present invention, as shown in FIGS. 1 and 2, the clamp member 24 may be a C-clamp 54 including a movable jaw 56 and a fixed jaw 58. The movable jaw 56 may be movable along the bar 22 relative to the fixed jaw 58 for capturing the frame member 14 therebetween. Additionally, the C-clamp 54 may include a trigger handle 60 being operative to selectively move the movable jaw 56 along the bar 22 toward the fixed jaw 58. However, as may be appreciated by one of skill in the art, the clamp member 24 may be configured to include various other elements that operate to connect the bar 22 to the frame member 14. In addition, multiple clamp members 24 may also be utilized.

The above description is given by way of example, and not limitation. Given the above disclosure, one skilled in the art could devise variations that are within the scope of the invention disclosed herein, including various ways of manufacturing or utilizing the device 10. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A clipboard mounting device for securing a clipboard to a frame member, the clipboard defining first and second opposing lateral edges, the device comprising:
    an elongate bar defining distal and proximate ends;
    a clamp member being attached to the distal end of the bar and being fastenable to the frame member; and
    first and second support elements being attached to the bar, the first support element being disposed at the proximate end of the bar, the second support element being slidably positionable along a length of the bar, the second support element including a slot being sized and configured to receive the bar therethrough to facilitate the slidable motion of the second support element on the bar, the support elements each including an engagement surface configured to engage the first and second lateral edges of the tablet to laterally capture the tablet, wherein the second support element includes upper and lower clamp portions being connectable to each other and defining the slot therebetween, the upper and lower clamp members being selectively adjustable relative to each other to adjust the size of the slot.

2. The device of claim 1 wherein the second support element further includes an aperture and a bar fastener, the aperture being at least partially disposed through the upper and lower clamp portions, the bar fastener being selectively insertable into the aperture to facilitate relative movement between the upper and lower clamp portions, the relative movement of the upper and lower clamp members being operative to reduce the size of the slot for securing the second support element to the bar.

3. A clipboard mounting device for securing a clipboard to a frame member, the clipboard defining first and second opposing lateral edges, the device comprising:

an elongate bar defining distal and proximate ends;

a clamp member being attached to the distal end of the bar and being fastenable to the frame member; and first and second support elements being attached to the bar, the first and second support elements being slidably positionable along a length of the bar, the first and second support elements each including a slot and a bar fastener, the slot being sized and configured to receive the bar therethrough to facilitate the slidable motion of the respective ones of the first and second support elements on the bar, the bar fastener being selectively adjustable to reduce the size of the slot for securing the respective ones of the first and second support elements to the bar, the first and second support elements each including an engagement surface configured to engage the first and second lateral edges of the tablet to laterally capture the tablet, wherein the first and second support elements each include a hole and the bar fastener is a bolt, the hole being directed from an outer surface of the respective ones of the first and second support elements inwardly until reaching the respective slot, the bolt being selectively insertable into the hole to engage the bar disposed through the slot, the engagement of the bolt with the bar being operative to impede movement of the respective ones of the first and second securing elements along the bar.

4. A clipboard mounting device for securing a clipboard to a frame member, the clipboard defining first and second opposing lateral edges, the device comprising:

an elongate bar defining distal and proximate ends;

a clamp member being attached to the distal end of the bar and being fastenable to the frame member, wherein the clamp member is a C-clamp including a movable jaw and a fixed jaw, the movable jaw being movable along the bar relative to the fixed jaw for capturing the frame member therebetween; and first and second support elements being attached to the bar, the first and second support elements being slidably positionable along a length of the bar, the first and second support elements each including a slot and a bar fastener, the slot being sized and configured to receive the bar therethrough to facilitate the slidable motion of the respective ones of the first and second support elements on the bar, the bar fastener being selectively adjustable to reduce the size of the slot for securing the respective ones of the first and second support elements to the bar, the first and second support elements each including an engagement surface configured to engage the first and second lateral edges of the tablet to laterally capture the tablet.

5. The device of claim 4 wherein the C-clamp includes a trigger handle being operative to selectively move the movable jaw along the bar toward the fixed jaw.

* * * * *